(12) United States Patent
Bennett

(10) Patent No.: US 8,690,432 B2
(45) Date of Patent: Apr. 8, 2014

(54) BEARING ASSEMBLY

(75) Inventor: Ian Robert Bennett, Cheltenham (GB)

(73) Assignee: Messier-Dowty Limited, Gloucester (GB)

( * ) Notice: Subject to any disclaimer, the term of this patent is extended or adjusted under 35 U.S.C. 154(b) by 51 days.

(21) Appl. No.: 13/266,497

(22) PCT Filed: Mar. 25, 2010

(86) PCT No.: PCT/GB2010/050509
§ 371 (c)(1),
(2), (4) Date: Jan. 13, 2012

(87) PCT Pub. No.: WO2010/125365
PCT Pub. Date: Nov. 4, 2010

(65) Prior Publication Data
US 2012/0111998 A1    May 10, 2012

(30) Foreign Application Priority Data

Apr. 27, 2009 (GB) .................................. 0907209.1

(51) Int. Cl.
*F16C 29/02* (2006.01)
(52) U.S. Cl.
USPC ..................... 384/10; 384/26; 384/32; 384/38
(58) Field of Classification Search
USPC ................................ 384/7, 10, 26–32, 38, 42
See application file for complete search history.

(56) References Cited

U.S. PATENT DOCUMENTS

| 3,333,513 | A | * | 8/1967 | Wettstein | 384/29 |
| 4,603,824 | A | * | 8/1986 | McArdel | 384/29 |
| 5,271,314 | A | | 12/1993 | Derrien | |
| 5,310,140 | A | | 5/1994 | Veaux et al. | |
| 6,012,847 | A | * | 1/2000 | Kahle | 384/42 |
| 6,702,464 | B1 | | 3/2004 | Takeuchi et al. | |
| 7,111,397 | B2 | * | 9/2006 | Serouart et al. | 29/898.054 |
| 2004/0028504 | A1 | | 2/2004 | Jakubowski et al. | |
| 2004/0111891 | A1 | | 6/2004 | Serouart et al. | |
| 2008/0041677 | A1 | | 2/2008 | Namuduri | |

FOREIGN PATENT DOCUMENTS

| CN | 101282848 A | 10/2008 |
| DE | 426999 | 8/1926 |
| DE | 21 64 579 | 6/1973 |
| DE | 29 10 350 | 2/1980 |

(Continued)

OTHER PUBLICATIONS

Chinese Patent Application No. 201080019392.6, Notice on the First Office Action, Date: Mar. 26, 2013, 11 pages.

(Continued)

*Primary Examiner* — Thomas R Hannon
(74) *Attorney, Agent, or Firm* — Hunton & Williams LLP

(57) ABSTRACT

A bearing assembly (2') comprising a housing (3') supporting first and second bearing ring portions (4, 4') with bearing surfaces to engage an inner tubular member (1') at axially spaced regions, characterized in that either: the bearing ring portions are provided by separate bearing rings (4') supported in the housing member (3') with bearing surfaces of different diameters; or the bearing ring portions are provided by a single bearing ring (4") that is free to flex radially and is supported so that the second bearing ring portion is free to flex radially under load and its bearing surface than assumes a position with a greater diameter than that of the first bearing ring portion (4").

10 Claims, 5 Drawing Sheets

(56) References Cited

FOREIGN PATENT DOCUMENTS

| | | |
|---|---|---|
| DE | 20204462 | 8/2003 |
| EP | 0865986 | 9/1998 |
| EP | 1754646 | 2/2007 |
| EP | 2425148 | 3/2012 |
| GB | 526352 | 9/1940 |
| GB | 2218387 | 11/1989 |
| GB | 2453554 A | 4/2009 |
| JP | S58028033 | 2/1983 |
| JP | S591179500 | 10/1984 |
| JP | S61077403 | 5/1986 |
| JP | 61 136031 | 6/1986 |
| JP | S61028932 | 11/1986 |
| JP | H10508813 | 9/1998 |
| JP | 2004124834 | 4/2004 |
| WO | 9615940 | 5/1996 |

OTHER PUBLICATIONS

Intellectual Property Office (UK), Search Report Under Section 17, Application No. GB0907209.1, Date of Search: Jun. 25, 2009, pp. 1-2.

Intellectual Property Office (UK), Search Report Under Section 18(3), Application No. GB0907209.1, Date of Report: May 7, 2013, p. 1.

European Patent Office, Communication Pursuant to Article 94(3) EPC, Date of Report: Jun. 25, 2013, pp. 1-6.

Chinese Patent Application No. 201080019392.6, Second Office Action, Date: Oct. 25, 2013, 7 pages (English Translation attached, 6 pages).

Japanese Application No. P2012-506570, Office Action, Date: Jan. 7, 2014, 6 pages (English Translation attached, 6 pages).

* cited by examiner

BEARING ASSEMBLY

This application claims priority to International Application No. PCT/GB2010/050509 filed Mar. 25, 2010 (now WO 2010/125365), which claims priority to both United Kingdom Patent Application No. 0907209.1 filed Apr. 27, 2009, both of which are incorporated herein by reference.

FIELD OF THE INVENTION

This invention relates to a bearing assembly arranged to support a tubular member which is subject to lateral deflection forces that may increase wear between the tubular member and a bearing ring. Such a problem can arise with the lower bearing of the sliding tube of a shock absorber strut of an aircraft landing gear.

Generally, the bearing assembly for the sliding tube of an aircraft shock absorber strut comprises a lower bearing and an upper bearing, and the lower bearing commonly comprises a housing which supports one or two axially spaced plain bearing rings both with the same diameter. The tube is free to slide axially within the bearings, but when it flexes laterally it can load an axially outermost edge of a bearing ring, as shown in FIG. 1, to create point contact, high pressure and high wear. As a solution to this problem, it has been proposed to taper the inner surface of the bearing ring in the axially outermost region where the point contact might occur so that any contact occurs over a larger surface area. The taper may be as small as half of a degree. However, when snap-in bearing rings are used to improve logistics and repairs, care would then be necessary to fit such a tapered bearing the right way round; with the risk of losing bearing area and not alleviating edge pressure if fitted the wrong way round. A baulking feature might be used to prevent incorrect assembly, but only at increased cost.

SUMMARY OF THE INVENTION

The invention consists in a bearing assembly comprising a housing supporting first and second bearing ring portions with bearing surfaces to engage an inner tubular member at axially spaced regions, characterised in that either: said bearing ring portions are provided by separate bearing rings supported in the housing member with the bearing surfaces of different diameters; or said bearing ring portions are provided by a single bearing ring that is free to flex radially and is supported so that the second bearing ring portion is free to flex radially under load and its bearing surface then assumes a position with a greater diameter than that of the first bearing ring portion.

In an embodiment of the invention implemented using two separate bearing rings, the second bearing ring with the greater diameter bearing surface only engages the tubular member when the latter flexes under load conditions, and the tubular member then engages the outer axial edges of both bearing rings towards that end of the bearing assembly from which the tubular member is loaded.

In an embodiment of the invention in which a single bearing ring provides said two bearing ring portions, the bearing ring may be located in a groove with an axially tapered or shaped base to accommodate the flexing of said second bearing ring portion, which is located on towards that end of the bearing assembly from which the tubular member is loaded.

In both of the above embodiments, substantially standard split ring, snap-in bearings can be used which do not have tapered bearing surfaces or otherwise require special assembly. In the case of the two separate bearing rings, the snap-in rings themselves may be identical, and the greater diameter bearing surface on the second bearing only occurs as a result of the bearing expanding to fit a larger diameter groove in the housing.

In an alternative embodiment of the invention, three or more bearing rings may be provided and mounted in the housing with progressively increasing diameters of their bearing surfaces.

In another alternative embodiment of the invention, two bearing rings may be provided with one bearing ring having said two bearing ring portions with one able to flex to a greater diameter position than the other under loaded conditions. The other bearing ring may be located on either side of the one bearing ring, nearer or further from that end of the bearing assembly form which the tubular member is loaded. In the former configuration, the other bearing ring preferably has a bearing surface of the greater diameter to which said one bearing ring portion is able to flex; and in the later configuration, the other bearing ring preferably has a bearing surface either of the same or a smaller diameter as that of said other bearing ring portion. In the later configuration, the two options of the invention may be combined.

In yet other alternative embodiments of the invention the tubular member may be deflected laterally from either axial end of the bearing assembly, in which case the bearing assembly may be symmetrical about a central diametral plane with either: one or more bearing rings with larger diameter bearing surfaces provided each side of an inner bearing ring or rings having a smaller diameter bearing surface; or with axially outer portions of a bearing ring provided each side of an inner portion so as to be free to flex radially to a greater diameter loaded position.

DESCRIPTION OF THE DRAWINGS

The invention will now be described by way of example with reference to the accompanying drawings in which.

EMBODIMENTS OF THE INVENTION

Figure 1:
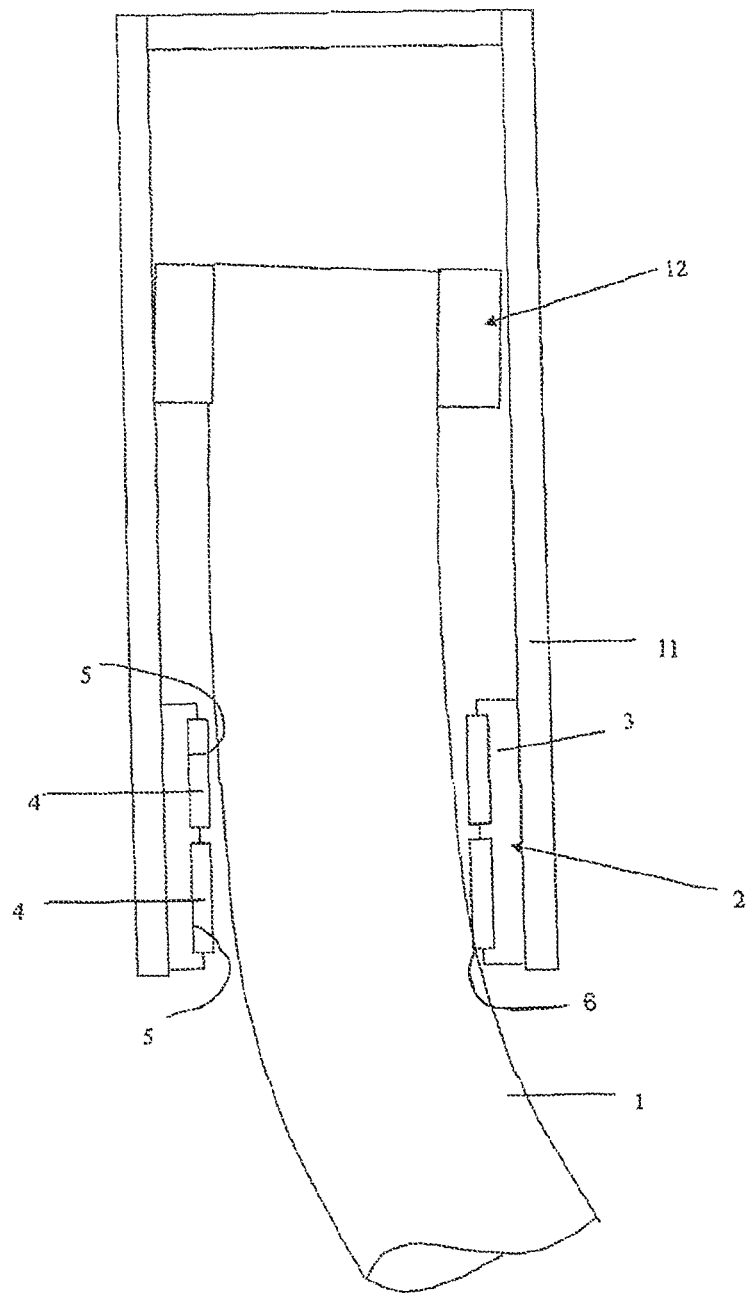
FIG. 1 is a schematic section of a known bearing assembly supporting a sliding tube of an aircraft landing gear strut.

The sliding tube 1 of the shock absorber strut of an aircraft main landing gear is shown in its upright configuration in FIG. 1 and supports a wheel or wheeled bogie at its lower end. The tube 1 is supported by upper and lower bearing assemblies 2 and 12 within a cylindrical strut housing 11. The upper bearing assembly 12 may be attached to the sliding tube such that it slides within the bore of the housing 11. Alternatively the upper bearing assembly 12 may be fixed to the bore of the housing 11 such that the sliding tube slides within it. The lower bearing assembly 2 is fixed within the lower end of the housing 11 and the sliding tube is free to slide axially within the lower bearing assembly. In use, forces applied to the wheel or wheeled bogie in taxi, take-off or landing modes will create a lateral deflection of the tube 1 that can cause wear problems in the lower bearing assembly. The lower bearing assembly consists of a bearing housing 3 that supports within it two identical plain bearing rings 4 spaced axially apart and each received in a respective groove 5 of identical depth in the inner surface of the housing 3.

The bearing rings 4 may be split rings and are a snap-fit in the grooves 5. When the tube 1 is in a laterally deflected state, as shown exaggerated in FIG. 1, it reacts against the upper bearing assembly 12 on one side of the tube, and engages the lower edge 6 of the lower bearing ring 4 on the diametrically opposite side of the tube. The contact with the lower bearing ring will initially at least be a point contact, which results in high wear.

Figure 2:
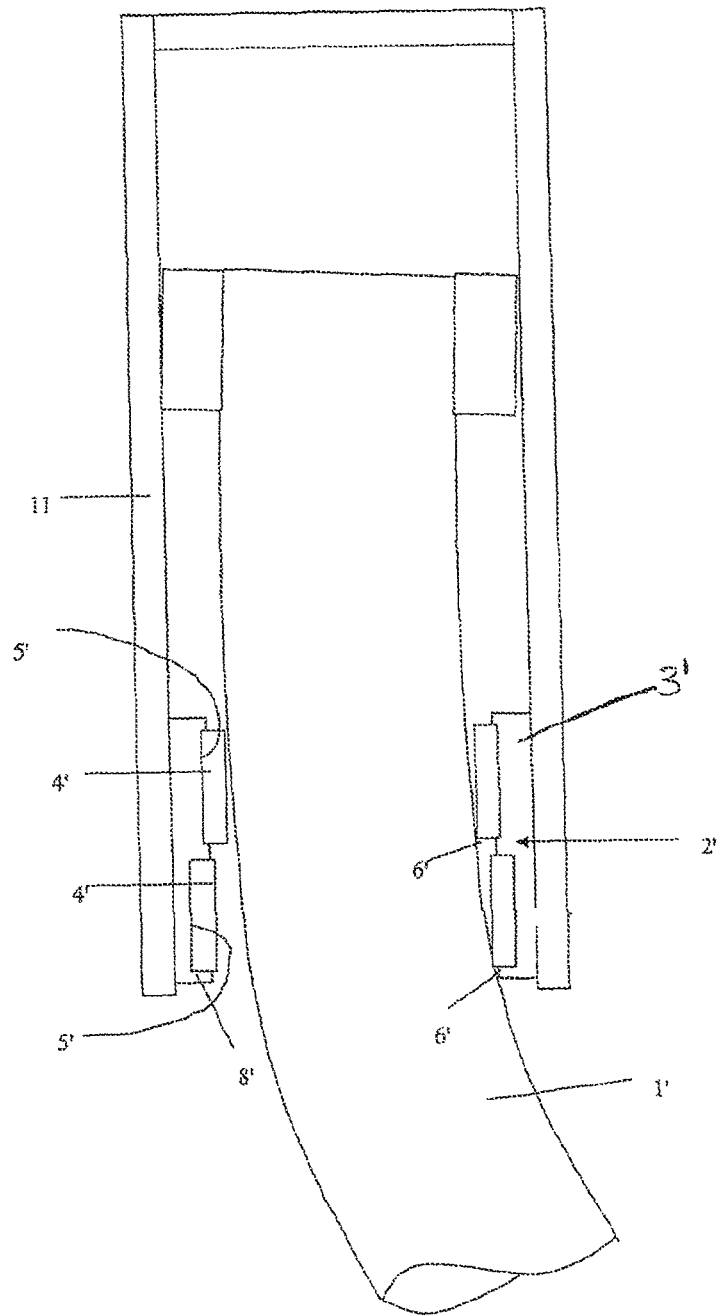
FIG. 2 is a schematic section of a bearing assembly according to a first embodiment of the invention.

The first embodiment of the invention shown in FIG. 2 comprises a lower bearing assembly 2' comprising a tubular housing 3' supporting an axially spaced pair of plain bearing rings 4', each received in a respective groove 5' in the inner surface of the housing 3' to engage a sliding tube 1' of a landing gear strut. The bearing rings 4' are identical split ring, snap-fit bearings but the groove 5' for the lower of the two bearing rings has a larger diameter than the groove 5' for the upper of the two bearing rings so that the lower bearing ring expands radially to assume a larger diameter within the lower groove 5'. The upper of the two lower bearing rings 4' when installed has an inner diameter to support the sliding tube 1' in the non-deflected condition, and the sliding tube 1' does not then engage the lower bearing ring 4'. However, when an applied load deflects the sliding tube 1' laterally, as shown exaggerated in FIG. 2, it engages the axially lower edges 6' of bearing rings 4'. Therefore, compared with the known bearing assembly of FIG. 1, the contact area between the sliding tube 1' and edges of the bearing rings 4' is increased in the embodiment of FIG. 2, and therefore wear caused by deflection of the tube is reduced, and frictional forces are distributed more evenly between the two bearing rings 4', and the risk of heat related problems such as ladder cracking are reduced. To avoid engagement of the sliding tube 1' with the lower edge of the housing 3' when deflected, the lower edge of the housing 3' may be cut back or chamfered as shown at 8'.

Figure 3:
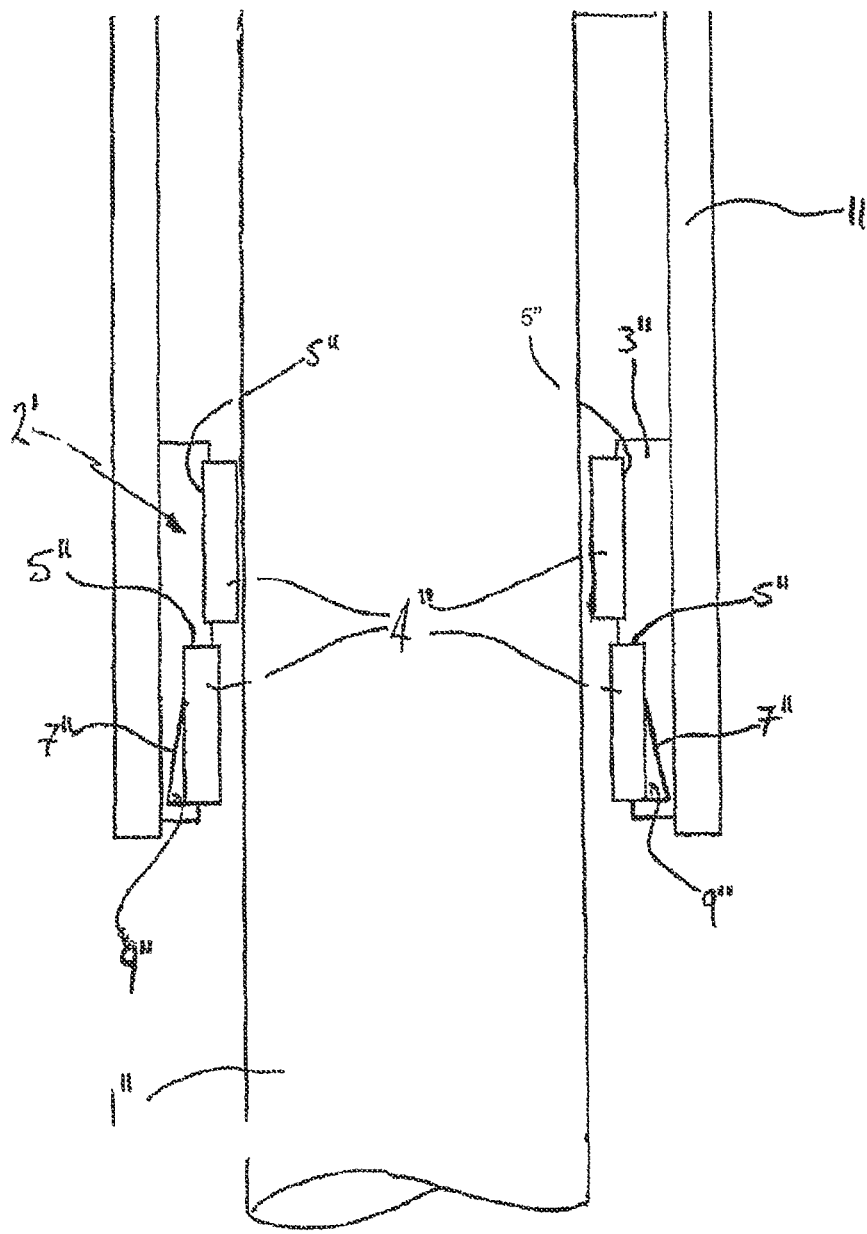
FIG. 3 is a schematic section of a bearing assembly according to a second embodiment of the invention.
Figure 4:
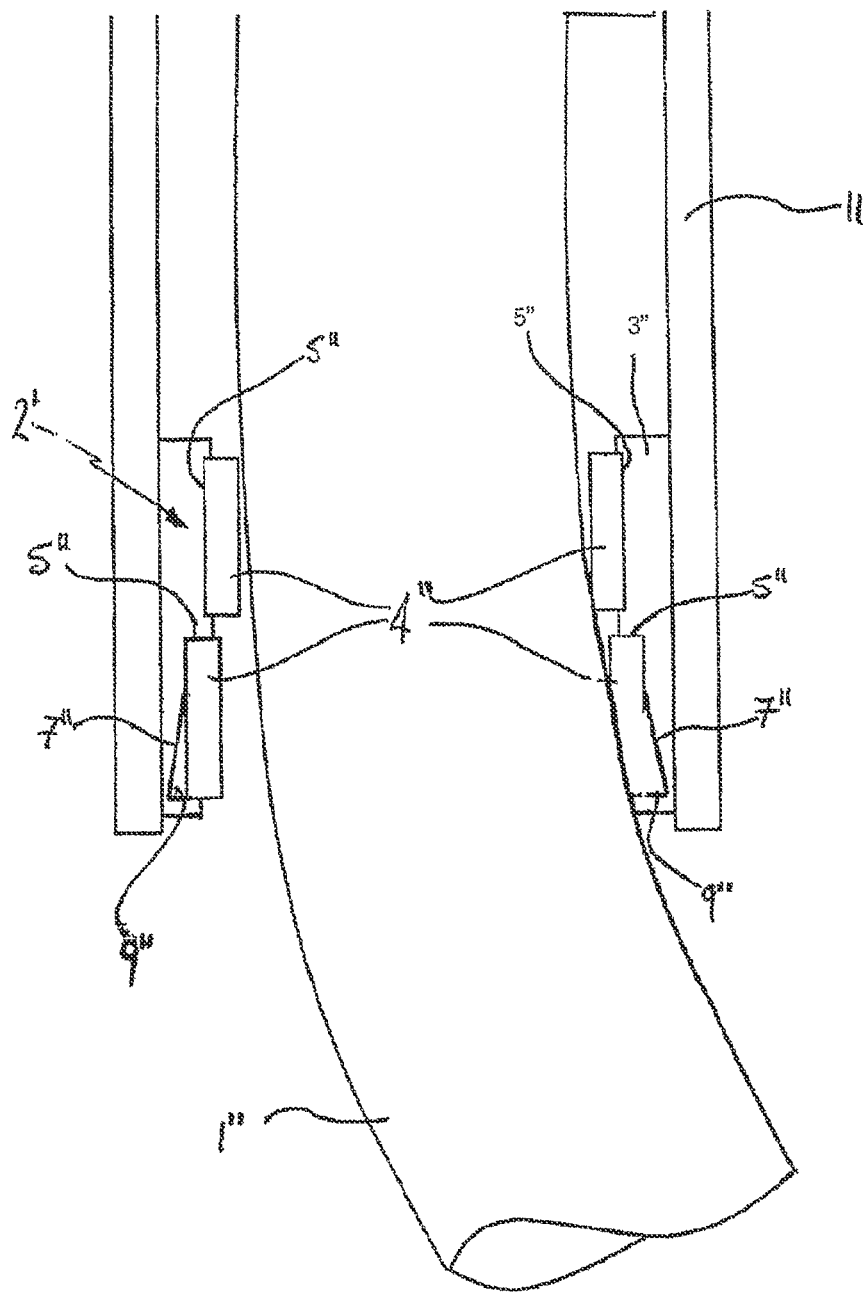
FIG. 4 is a similar view to that of FIG. 3 but showing the sliding tube deflected.

The second embodiment of the invention shown in FIG. 3 is similar to that of FIG. 2 in that two bearing rings 4" in the lower bearing assembly are accommodated in grooves 5" of different depth in the internal surface of a tubular housing 3". However, there is a further feature in that the groove 5" for the lower of the two bearing rings has a shaped portion 7" of increasing diameter towards the lower end of the housing 3". The lower bearing ring 4" is able to flex radially under load so that the lower portion of the lower bearing ring 4" is deflected into the radially enlarged portion 9" of groove 5" so as to increase its area of contact with the sliding tube 1", as shown in FIG. 4.

In an alternative embodiment of the invention, the lower of the two lower bearing rings 4" in FIG. 3 may be supported in a groove 5" so that the innermost portion of the bearing ring is supported at the same diameter as the upper of the two lower bearing rings 4". The innermost portion of the lower bearing ring therefore engages and supports the sliding tube 1' in the same manner as the uppermost bearing ring 4". In an alternative embodiment of the invention, the uppermost bearing ring 4" might be omitted so that the lowermost bearing 4" ring alone supports the sliding tube.

Figure 5:
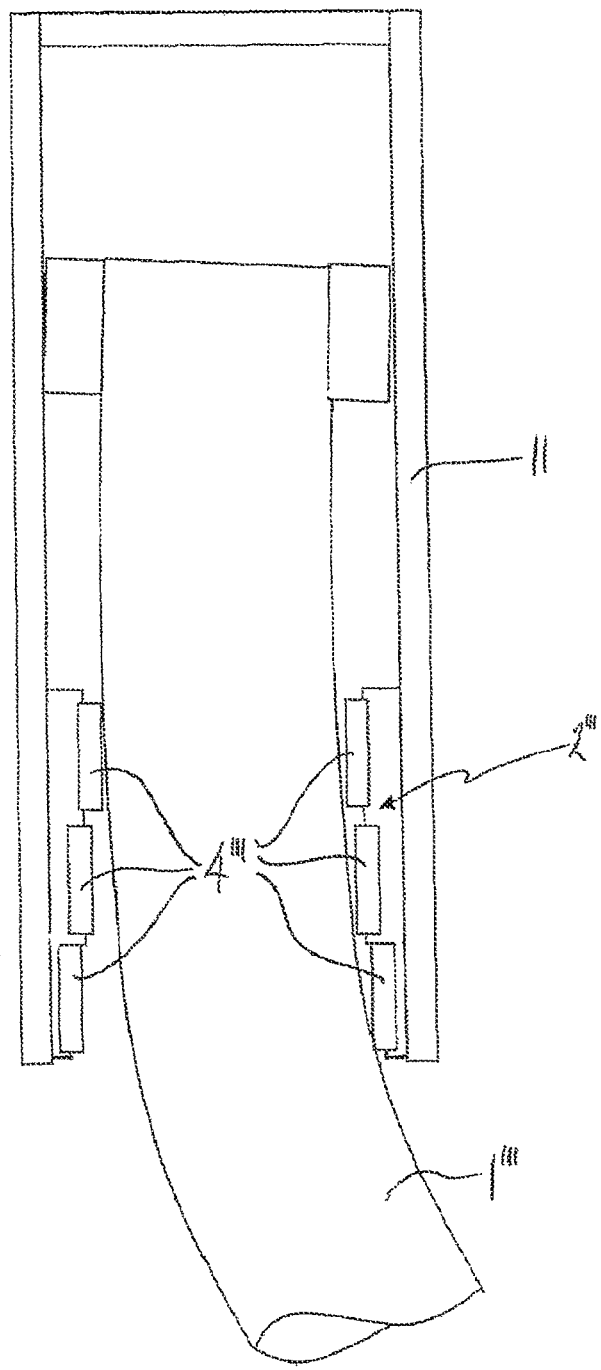
FIG. 5 is a schematic section of a bearing assembly according to a third embodiment of the invention having three bearing rings.

Alternative embodiments of the invention, such as shown in FIG. 5, may incorporate a third or even more bearing rings 4'" spaced axially apart within the housing 2'", and each of the second and successive bearing rings are received in grooves of progressively larger diameter so that the bearing rings form a stepped array with the sliding tube 1'" engaging the edges of the rings/steps when it is deflected laterally, thereby spreading the load over the edges of three or more bearing rings.

In the illustrated embodiments, the upper bearing assembly 12 takes the form of a plain fixed bearing but it will be appreciated that this can also be adapted according to the invention and could fully or partially mirror the features of the lower bearing assembly 2.

In yet other alternative embodiments of the invention, the sliding tube 1 instead of being loaded laterally at only one end where it projects from a shock absorber strut, may be a tubular member that projects from both sides of the bearing assembly and can be loaded laterally at either end. The bearing assembly may then be symmetrical about a central diametral plane with the arrangement of the bearing ring or bearing rings substantially mirror images of one another either side of the central diametral plane.

The invention claimed is:

1. A bearing assembly comprising a housing supporting first and second bearing ring portions with bearing surfaces to engage an inner tubular member at axially spaced regions, characterised in that either:
   said bearing ring portions are provided by separate bearing rings supported in the housing member with bearing surfaces of different diameters; or
   said bearing ring portions are provided by a single bearing ring that is free to flex radially and is supported so that the second bearing ring portion is free to flex radially under load and its bearing surface then assumes a position with a greater diameter than that of the first bearing ring portion, wherein said single bearing ring is mounted in a groove in the housing with a tapered base.

2. A bearing assembly as claimed in claim 1 in which said separate bearing rings are each located in a separate groove in the housing with one groove having a larger diameter than the other.

3. A bearing assembly as claimed in claim 1 in which the housing has an inner tubular surface from which the bearing rings project radially, and a portion of the inner tubular surface at one axial end of the housing adjacent the bearing ring with the larger diameter bearing surface is cut away to accommodate lateral flexing of the tubular member in use.

4. A bearing assembly as claimed in claim 1 in which three or more bearing rings are provided and mounted in the housing member to be axially spaced apart and with bearing surfaces of progressively increasing diameter from one bearing ring to the next towards an axial end of the housing.

5. A bearing assembly as claimed in claim 1 in which the housing of the single bearing ring has an inner tubular surface from which the bearing ring projects radially, and a portion of the inner tubular surface at one axial end of the housing of the single bearing ring adjacent the bearing ring portion able to flex radially is cut away to accommodate lateral flexing of the tubular member in use.

6. A bearing assembly as claimed in claim 1 in which the separate bearing rings are identical.

7. A bearing assembly as claimed in claim 1 in which the separate bearing rings are each symmetrical about their own central diametral planes.

8. A bearing assembly as claimed in claim 1 including a tubular member supported within the bearing assembly.

9. An aircraft landing gear shock absorber strut with a bearing assembly as claimed in claim 1.

10. An aircraft including an aircraft landing shock absorber strut as claimed in claim 9.

* * * * *

UNITED STATES PATENT AND TRADEMARK OFFICE
CERTIFICATE OF CORRECTION

PATENT NO.        : 8,690,432 B2                                                      Page 1 of 1
APPLICATION NO.   : 13/266497
DATED             : April 8, 2014
INVENTOR(S)       : Ian Robert Bennett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this
Twenty-ninth Day of September, 2015

Michelle K. Lee
*Director of the United States Patent and Trademark Office*